United States Patent
Kwon et al.

(10) Patent No.: US 7,003,372 B2
(45) Date of Patent: Feb. 21, 2006

(54) APPEARANCE PROCESSING METHOD AND ASPHERIC LENS FABRICATING METHOD USING THE SAME

(75) Inventors: Hyouk Kwon, Seoul (KR); Young-Joo Yee, Seongnam (KR)

(73) Assignee: LG Electronics Inc., Seoul (KR)

( * ) Notice: Subject to any disclaimer, the term of this patent is extended or adjusted under 35 U.S.C. 154(b) by 132 days.

(21) Appl. No.: 10/689,673

(22) Filed: Oct. 22, 2003

(65) Prior Publication Data

US 2004/0088067 A1    May 6, 2004

(30) Foreign Application Priority Data

Oct. 24, 2002  (KR) ............... 10-2002-0065334

(51) Int. Cl.
  *G06F 19/00*  (2006.01)
  *G21K 5/10*  (2006.01)
(52) U.S. Cl. ............... 700/187; 700/160; 250/492.3
(58) Field of Classification Search ............... 700/160, 700/166, 187, 97; 250/492.1, 492.3
  See application file for complete search history.

(56) References Cited

U.S. PATENT DOCUMENTS

| | | | | |
|---|---|---|---|---|
| 5,541,411 A | * | 7/1996 | Lindquist et al. | 250/309 |
| 6,138,503 A | * | 10/2000 | Ray | 73/105 |
| 6,238,582 B1 | * | 5/2001 | Williams et al. | 216/22 |
| 6,423,240 B1 | * | 7/2002 | Wang et al. | 216/22 |
| 6,565,720 B1 | * | 5/2003 | Ring | 204/192.34 |
| 6,664,552 B1 | * | 12/2003 | Shichi et al. | 250/492.21 |
| 6,726,322 B1 | * | 4/2004 | Andino et al. | 351/160 R |
| 2002/0092985 A1 | * | 7/2002 | Ishitani et al. | 250/309 |
| 2004/0099638 A1 | * | 5/2004 | Miller | 216/94 |

* cited by examiner

*Primary Examiner*—Paul Rodriguez
(74) *Attorney, Agent, or Firm*—Birch, Stewart, Kolasch & Birch, LLP

(57) ABSTRACT

Disclosed is an appearance processing method comprising: designing a reference appearance for designing a set shape as a theoretical value; producing a specimen; comparing the reference appearance with the specimen and thus setting a deviation region; performing ion beam milling for milling the deviation region of the specimen by ion beam; and comparing the milling-processed specimen with the reference appearance after the ion beam milling thus to obtain a deviation and milling the deviation region repeatedly thus to make the specimen consist with the reference appearance. Accordingly, an arbitrary shape, a minute spherical surface, or an aspheric shape can be precisely processed, and a large quantity of fabrication by a uniform processing precision is possible.

9 Claims, 4 Drawing Sheets

TANGENTIAL SURFACE DIRECTION: $(x,y,z) = (-\sin\theta\cos\psi, -\sin\theta\sin\psi, \cos\theta)$ MILLING DIRECTION: $(x,y,z) = (\cos\phi, 0, \sin\phi)$

APPEARANCE PROCESSING METHOD AND ASPHERIC LENS FABRICATING METHOD USING THE SAME

This nonprovisional application claims priority under 35 U.S.C. § 119(a) on Patent Application No. 2002-65334 filed in KOREA on Oct. 24, 2002, which is herein incorporated by reference.

BACKGROUND OF THE INVENTION

1. Field of the Invention

The present invention relates to an appearance processing method, and more particularly, to an appearance processing method capable of precisely processing a minute spherical surface or an aspheric shape and performing a large quantity of fabrication with a uniform processing precision and an aspheric lens fabricating method using the same.

2. Description of the Conventional Art

Recently, as multimedia and an information communication technique are fast developed, an optical data storage, a fiber-optic system communication system, a display, and etc. are miniaturized. As an optical system is miniaturized, individual optical components have to be miniaturized and especially lenslets corresponding to a core factor of an optical system have to be miniaturized. The reason is because a processing precision has to be maintained as a miniaturization ratio in order to maintain an optical function of an existing lens and reduce a size of a lens itself.

An ultra-micro refractive lens can be variously applied as a collimating lens, an objective lens, a solid immersion lens, and etc. as shown in an example of a pick-up optical system of a micro optical data storage which can be applied to a portable information device and etc., and a surface of the ultra-micro refractive lens has to be processed not only as a spherical shape but also as an aspheric shape.

According to the conventional lens processing technique, a spherical lens or an aspheric lens of a desired shape were implemented by using a minute polishing method or various forming methods such as a precise molding, pressing, and an injection. The conventional technique is proper to fabricate comparatively voluminous refractive lens, but it is difficult to uniformly process a micro-lens of which diameter is smaller than a millimeter according to the conventional technique.

In addition to said lens fabricating technique using a mechanical polishing method and forming methods, there is a reflow technique for processing a partial spherical lens having an arbitrary radius of curvature by a generated surface tension by heating optically transparent polymer material with a temperature more than a glass transition temperature, and there is a method for fabricating lens by transferring a curved surface shape formed by the reflow technique on a predetermined substrate by using a reactive ion etching technique or an ion milling technique.

By said conventional micro-lens fabricating methods, a spherical lens can be miniaturized. However, it is limited to minutely process a micro-lens of which a spherical aberration is removed and a processing uniformity is lowered thus to degrade a mass production.

SUMMARY OF THE INVENTION

Therefore, an object of the present invention is to provide an appearance processing method capable of precisely processing an arbitrary minute spherical surface or an aspheric shape and performing a large quantity of fabrication with a uniform processing precision and an aspheric lens fabricating method using the same.

To achieve these and other advantages and in accordance with the purpose of the present invention, as embodied and broadly described herein, there is provided an appearance processing method comprising: designing a reference appearance for designing a set shape as a theoretical value; producing a specimen; comparing the reference appearance with the specimen and thus setting a deviation region; and performing ion beam milling for milling the deviation region of the specimen by ion beam.

To achieve these and other advantages and in accordance with the purpose of the present invention, as embodied and broadly described herein, there is also provided an aspheric lens fabricating method comprising: designing a desired aspheric surface; producing a basic lens of an arbitrary shape; comparing the desired aspheric surface with the basic lens and thus setting a deviation region; performing ion beam milling for milling the deviation region of the basic lens by ion beam; and processing a shape of the basic lens with comparison with the desired aspheric shape by the ion beam milling and making the basic lens consistent with the desired aspheric shape.

The foregoing and other objects, features, aspects and advantages of the present invention will become more apparent from the following detailed description of the present invention when taken in conjunction with the accompanying drawings.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE PREFERRED EMBODIMENTS

Reference will now be made in detail to the preferred embodiments of the present invention, examples of which are illustrated in the accompanying drawings.

Hereinafter, an appearance processing method and an aspheric lens fabricating method using the same will be explained.

Figure 1:
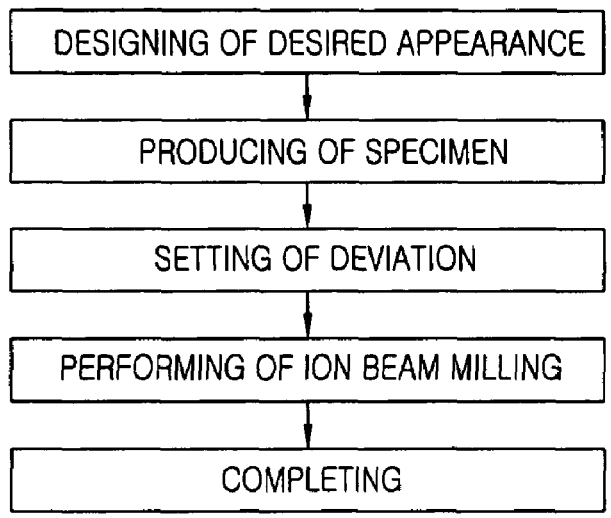
FIG. 1 is a flow chart showing one embodiment of an appearance processing method according to the present invention.
Figure 2:
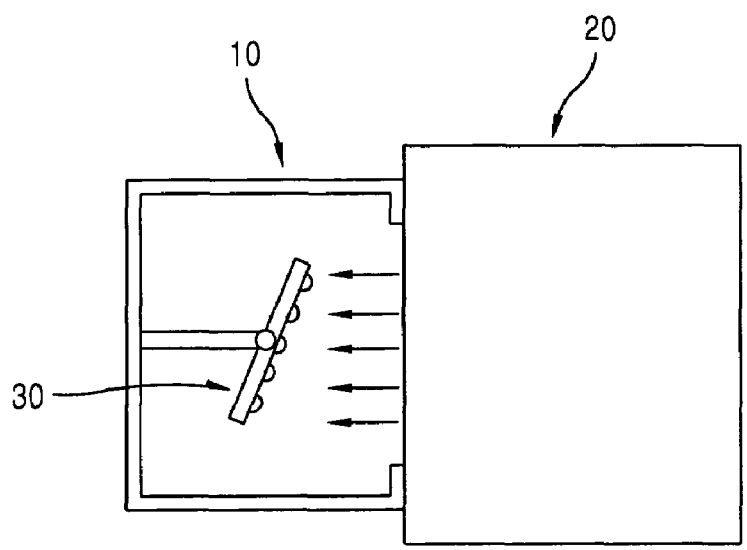
FIG. 2 is a lateral view showing a general ion beam miller.

FIG. 1 is a flow chart showing one embodiment of an appearance processing method according to the present invention. As shown, in the appearance processing method, a reference appearance designing step for designing a set shape as a theoretical value and a specimen producing step for producing a specimen are performed. In said reference appearance designing step, a designed reference appearance includes a concave surface, a convex surface, or a plane. The specimen is formed as a shape that can be repeatedly and massively produced. That is, the reference appearance is an ideal appearance to be fabricated, and the specimen has a similar shape to the ideal appearance that can be repeatedly and massively produced. The specimen is a transparent material and can be a coupling of hetero material.

Then, a deviation setting step for comparing the reference appearance with the specimen and thus setting a deviation region, and an ion beam milling step for milling the deviation region of the specimen by ion beam are performed.

The ion beam milling is performed by an ion beam miller, and the ion beam miller comprises a reaction container 10 having an inner space, an ion generating unit 20 installed at one side of the reaction container 10 for ionizing gas such as Ar and then accelerating, and a specimen mounting unit 30 movably installed in the reaction container 10 for mounting a specimen.

Operation of the ion beam miller will be explained. First, ion beam, ion accelerated in the ion generating unit 20 is sprayed into the reaction container 10. Then, a specimen mounted in the specimen mounting unit 30 is exposed to the ion beam and thus etched by the ion beam. The ion beam milling is a representative physical etching processing method and a technique for etching a surface layer of a specimen only with a physical method excluding a chemical reaction in a circumstance that a high vacuum degree is maintained. According to the ion beam milling technique, a milling rate corresponding to an etching rate is comparatively low, a processing for a long time is possible, and a roughness of a processed surface is very less, thereby enabling a minute surface processing.

Figure 3:
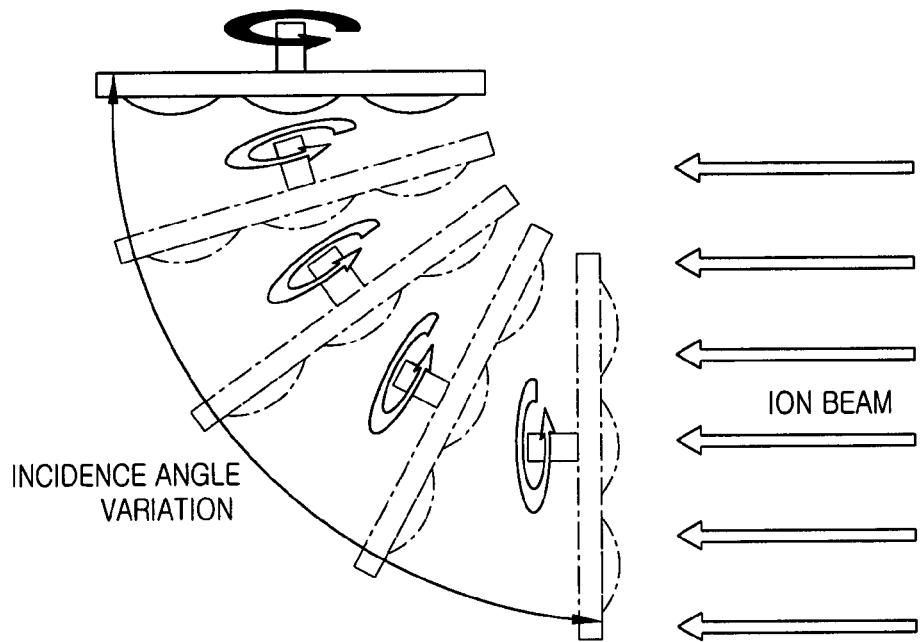
FIG. 3 is a lateral view of a specimen mounting unit showing an incidence angle variation of a specimen for ion beam.

A method for processing a deviation region of a specimen and a deviation amount by the ion beam milling will be explained. As shown in FIG. 3, when the specimen mounting unit 30 moves, a plurality of specimens mounted at the specimen mounting unit 30 move thus to control an incidence angle of ion beam and control milling time, thereby milling the specimens. Since the specimen mounting unit 30 is rotated and moved with declination for an incidence direction of ion beam, the specimens mounted at the specimen mounting unit 30 can be rotated and declined for an incidence angle of ion beam. That is, as the specimen declines for ion beam made to be incident to the specimen, an incidence angle of ion beam is controlled and at the same time exposure time of the specimen exposed to ion beam is controlled, thereby processing the specimens. According to an incidence angle of ion beam made to be incident to the specimen and exposure time of the specimen exposed to ion beam, an etching rate of a surface of the specimen becomes different. Therefore, by using this, a deviation region of the specimen and the deviation amount are controlled thus to be processed.

At this time, after performing the ion beam milling for a constant time, the milling-processed specimen is compared with the reference appearance thus to obtain a deviation, and milling of the deviation region and deviation amount are repeatedly performed, thereby making the specimen consistent with the reference appearance. That is, the ion beam milling is performed for a constant time, and the specimen is measured thus to be compared with the reference appearance, then milling of the deviation region and deviation amount between the reference appearance and the specimen is performed again. Said processes are repeated thus to make the specimen consistent with the reference appearance.

Figure 4:
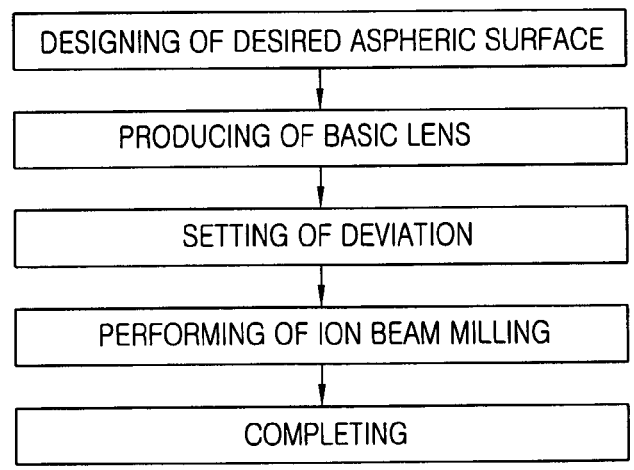
FIG. 4 is a flow chart showing one embodiment of an aspheric lens fabricating method according to the present invention.

FIG. 4 is a flow chart showing one embodiment of an aspheric lens fabricating method according to the present invention. As shown, the aspheric lens fabricating method comprises: designing a desired aspheric surface; producing a basic lens of an arbitrary shape; comparing the desired aspheric surface with the basic lens and thus setting a deviation region; performing ion beam milling for milling the deviation region of the basic lens by ion beam; and processing a shape of the basic lens with comparison with the desired aspheric shape by the ion beam milling and making the basic lens consistent with the desired aspheric shape.

The desired aspheric shape includes a parabolic shape and an elliptical shape.

The basic lens has an ideal spherical shape that can be massively produced easily, and has a very small minute shape.

The ion beam milling is performed by the aforementioned ion beam miller. Herein, milling is performed in a state that a plurality of basic lens are positioned at the specimen mounting unit 30 of the ion beam miller.

A method for fabricating a desired aspheric lens curved surface from the basic lens of a minute ideal spherical shape will be explained in more detail.

First, an aspheric shape to be processed, that is, a desired aspheric shape Z can be obtained by setting coefficients $A^4$, $A^6$, $A^8$, and etc. of a polynomial having an aspheric deviation by using a desired radius of curvature C and a conic constant $\epsilon$ as a following formula (1).

$$Z = ch^2/(1+\sqrt{(1-\epsilon c^2 h^2)}) + A^4 h^4 + A^6 h^6 + A^8 h^8 + A^{10} h^{10} + A \quad (1)$$

In the above formula, h denotes a sag height of an apex of an aspheric lens curved surface. The aspheric shape is compared with an ideal spherical shape thus to obtain a deviation therebetween, and time t is controlled through a gradient S according to a relation between an incidence angle ($\Phi$) of ion beam and a tangential plane of a spherical surface of an arbitrary position for a shape difference in each term and a milling rate A of a basic lens in a predetermined milling process condition, thereby designing a milling process.

This can be expressed as a combination of a partial ion milling process like a following formula (2).

$$\text{Total milling process} = A \, \Sigma S_n t_n \quad (2)$$

Figure 5:
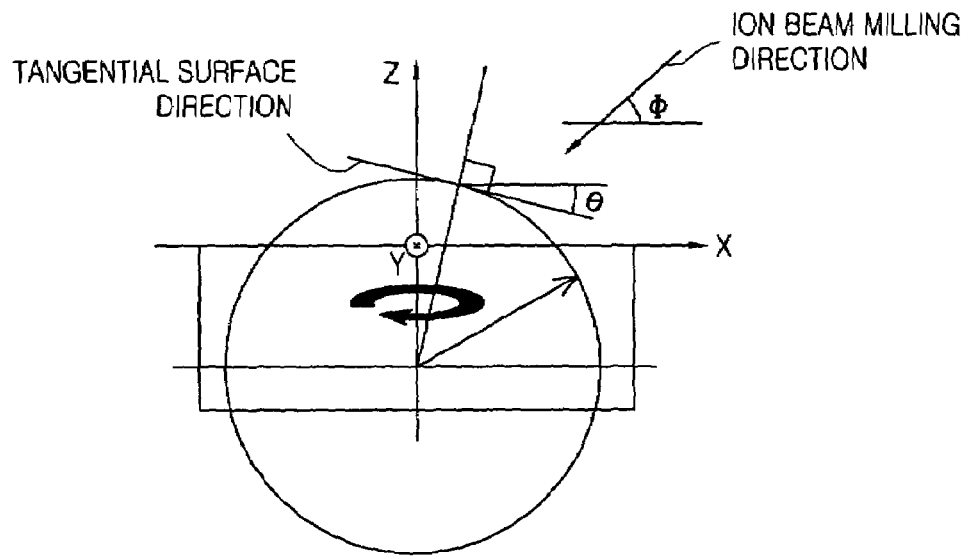
FIGS. 5 and 6 are frontal and plane views of a basic lens showing a relation between an incident ion beam direction and a tangential plane direction at an arbitrary position of a curved surface where an etching by milling is performed at the time of ion beam milling.
Figure 6:
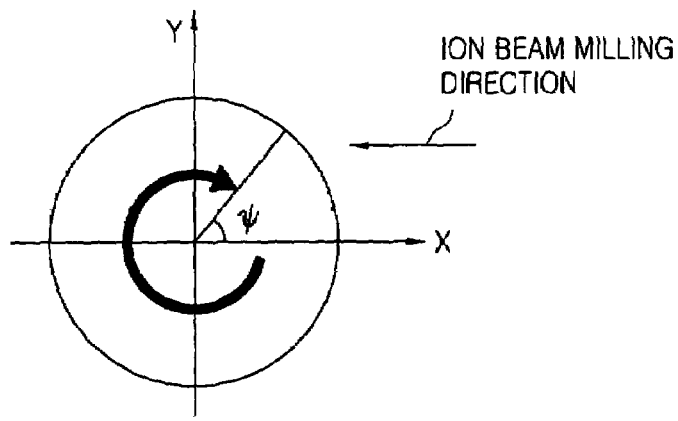

Herein, the n denotes the number of times of an independent milling process required to implement the aspheric shape. As shown in FIGS. 5 and 6, at the time of an ion beam milling process, a relation between an incident ion beam direction and a tangential plane direction at an arbitrary position of a curved surface where an etching by milling is performed, that is, a relation between an incidence angle $\Phi$ of ion beam, a milling direction and a tangential plane direction at an arbitrary position of a lens curved surface can be expressed as a following formula (3). This is equally applied to the milling direction between the X axis and the Z axis, the tangential plane direction X axis, and the Y axis thus to obtain a directional cosine of two directions for a three-dimensional space. This is converted into a rotation region based on the Z axis thus to average an integrated value, which is expressed as the following formula (3).

$$S = -(1/\pi)\sin\theta \cos\Phi + \cos\theta \sin\Phi \quad (3)$$

Said formula is deduced from a supposition that rotation is very fast performed on the basis of the Z axis and milling is not performed toward the −X axis direction of a curved surface which is the same direction as the milling direction for the X and Y axes. By properly combining the formula (3), a milling rate, and milling time (exposure time) by multiplying one another, a desired aspheric shape can be obtained through a minute surface processing due to milling.

A milling process for a desired aspheric shape, that is, a desired aspheric shape from the ideal spherical shape will be explained. First, ion beam milling for a basic lens of the ideal spherical shape is performed for a constant time and the basic lens is measured thus to be compared with the desired aspheric shape. Then, ion beam milling for a deviation region and deviation amount between the desired aspheric shape and the basic lens is again performed. Said processes are repeated, thereby making the basic lens of the ideal shape consistent with the desired aspheric shape.

Figure 7:
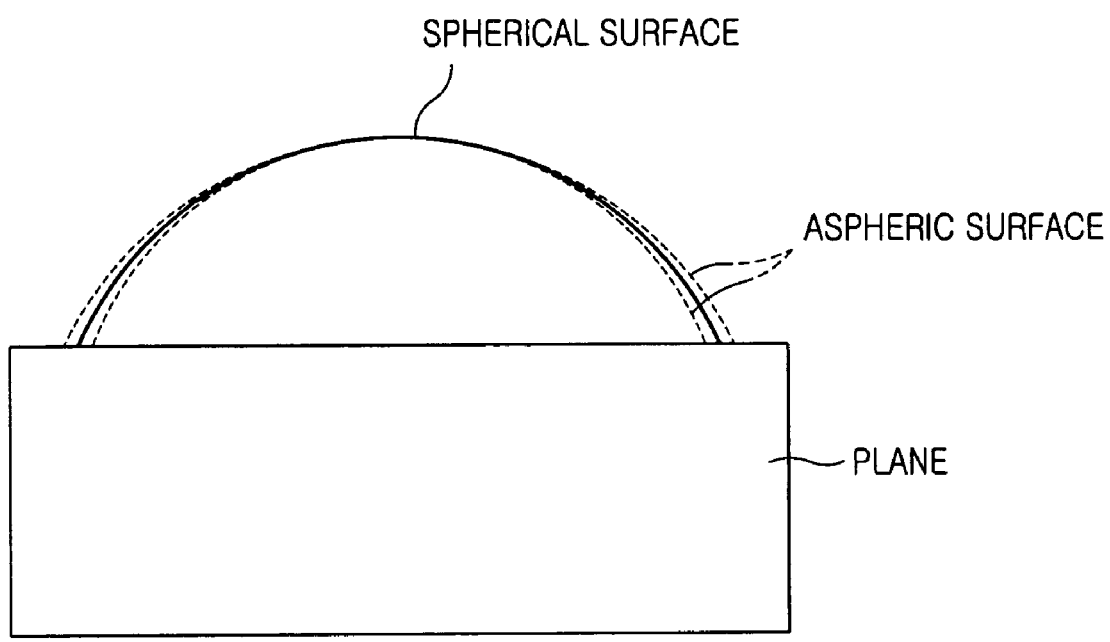
FIG. 7 is a frontal view of a basic lens showing a processing range of the present invention.

Comparing the basic lens with the desired aspheric shape is performed by obtaining a deviation region and a deviation amount by using a stylus profiling method or an interferometer. That is, a surface profile of a processed basic lens is measured by using the stylus profiling method or the interferometer, and the shape is compared with the desired aspheric shape thus to perform milling for a deviation region and a deviation amount, thereby completing the basic lens of an ideal shape as a desired aspheric shape. FIG. 7 shows a surface profile of an aspheric lens which can be processed from a basic lens of an ideal shape according to the present invention.

Said method can be very advantageously applied not only to a fabrication of a micro-spherical surface or an aspheric lens but also to a processing to modify a very small shape into a predetermined different shape. Also, since the ion beam milling is not a process including a chemical reaction, an etching mask such as photoresist is etched on a compound material, thereby easily transferring a minute structure of a preprocessed desired shape and etc. to a substrate. In addition, in the present invention, a fabrication cost can be reduced, a large quantity of fabrication is easy, a uniformity between processed ultra-micro lens is increased than the conventional minute polishing processing method or an injection method by a molding. Generally, the less the number of lens is, the more transmittance efficiency is increased and the less a production cost is, which can be satisfied by the aspheric lens processing of the present invention.

Also, the micro-lens fabricated by the present invention can be applied to various fields requiring miniaturized and enhanced optical function such as a lens or a lens array necessary to an optical data storage of a portable information device, an optical transmitting/receiving module of a fiber-optic communication system, each kind of display, and etc.

As aforementioned, in the appearance processing method and the aspheric lens fabricating method using the same according to the present invention, an arbitrary shape, a minute spherical surface, or an aspheric shape can be precisely processed, and a large quantity of fabrication by a uniform processing precision is possible, thereby enhancing a lens function, reducing a fabrication cost, and being applied to various fields requiring an enhanced optical function.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the metes and bounds of the claims, or equivalence of such metes and bounds are therefore intended to be embraced by the appended claims.

What is claimed is:

1. An aspheric lens fabricating method comprising:
    designing a desired aspheric surface;
    producing a basic lens of an arbitrary shape;
    comparing the desired aspheric surface with the basic lens and thus setting a deviation region;
    performing ion beam milling for milling the deviation region by exposing the deviation region to an ion beam by rotating and inclining the basic lens and by controlling exposure time according to a processing depth of the deviation region; and
    processing a shape of the basic lens by comparison with the desired aspheric surface by the ion beam milling and making the basic lens consistent with the desired aspheric surface.

2. The method of claim 1, wherein the basic lens is an ideal spherical shape than can be massively produced easily.

3. The method of claim 1, wherein the desired aspheric surface has a parabolic shape.

4. The method of claim 1, wherein the desired aspheric surface has an elliptical shape.

5. The method of claim 1, wherein comparing the basic lens processed by ion beam milling with the desired aspheric surface is performed by a stylus profiling method.

6. The method of claim 1, wherein comparing the basic lens processed by ion beam milling with the desired aspheric surface is performed by an interferometer.

7. The method of claim 1, wherein in the step of performing an ion beam milling, a plurality of the basic lenses are mounted at a specimen mounting unit.

8. The method of claim 7, wherein the specimen mounting unit not only rotates the basic lenses mounted thereto but also inclines the basic lenses.

9. The method of claim 1, wherein the basic lens is formed of a mixture between hereto materials.

* * * * *